United States Patent Office 3,249,467
Patented May 3, 1966

---

3,249,467
METHOD OF FORMING METALLIC FILMS
ON GLASS
Stanley D. Stookey, Corning, N.Y., assignor to Corning
Glass Works, Corning, N.Y., a corporation of New
York
No Drawing. Original application Sept. 30, 1960, Ser.
No. 59,496, now Patent No. 3,135,046. Divided and
this application Dec. 10, 1962, Ser. No. 249,548
3 Claims. (Cl. 117—212)

This application is a division of application Serial No. 59,496, filed Sept. 30, 1960, now Patent No. 3,135,046.

This application relates to a method for producing a metallic film on the surface of a glass body.

In the manufacture of many glass articles it is desirable to place on the surface thereof a metallic film for a variety of reasons. Thus in some instances it is desirable to decorate glass articles such as pitchers, vases, glasses and the like with metallic patterns. In the design of electronic apparatus it may also be desirable to delineate an electrically conducting path on the surface of an insulating glass base to produce a circuit board. Likewise, it is in some cases desirable to produce a metallic film on a glass article such as a tube to allow sealing by solder or the like to a metallic element.

For any of these applications it is very desirable to be able to delineate the desired pattern with a minimum of effort and it is also necessary that the film adhere to the glass surface with sufficient tenacity to enable it to withstand ordinary handling, washing, soldering thereto, and the like.

The principal object of this invention is to provide a method for the application of an adherent metallic coating on the surface of a glass article.

Another object is to provide a method for the production of thin sheets of metallic material having a predetermined shape.

I have found that the object of this invention can be achieved by sensitizing the surface of a glass in the desired areas and then chemically depositing a metallic mirror upon the glass surface. The surface of the glass can be sensitized either by forming an electro-conductive metal oxide film on the desired areas or by forming a colloidal silver image in the surface of the glass in accordance with the method described in my Patent No. 2,732,298. Likewise, a metallic mirror of either copper or silver can be chemically deposited on the surface of glass by reducing the corresponding metallic ions in a solution in contact with the glass.

The electro-conducting metal oxides comprise the oxides of cadmium, indium, and tin, as well as combinations of the oxides of tin and antimony, tin and indium, and cadmium and indium. The oxide films are deposited on the glass surface preferably by heating the glass uniformly to an elevated temperature, which may be about 500° C. or above, and atomizing a solution containing the desired metal salts as a fine mist upon the glass for a time sufficient to produce a coating of the desired thickness. Of the above named metals, those salts which can be hydrolyzed or decomposed in the presence of water, such as the chlorides, are used and these, on contact with the hot glass, form thin strongly adherent coatings of the corresponding oxides.

The electro-conducting film may be limited to the desired areas of the glass surface by previously coating the areas of the glass surface which are not to be covered with the metallic film with a readily removable masking material. Suitable masking materials are diatomaceous earth, whiting, bentonite, titanium dioxide, and fuller's earth suspended in water and/or alcohol. The suspensions can be painted or sprayed on to the surface of the glass, utilizing a stencil or similar shield to delimit the coated areas. The masking material may then be washed off the glass surface after the electro-conductive metal oxide coating has been applied thereto or after the metallic mirror has been deposited on the sensitized portion of the glass.

In utilizing the method of the aforementioned patent to sensitize the glass surface, the selected areas are defined in accordance with the described process.

The metal film is applied by immersing at least the sensitized areas in a copper or silver mirror plating solution. As the thus formed mirror adheres with greater tenacity to the sensitized portion than to the unsensitized glass surface, the mirror can be easily removed from the unsensitized areas by washing in water.

Furthermore, as the thus deposited metal mirror is electrically conducting, it is possible to further deposit additional copper or silver, or other metal, on the desired areas by conventional electroplating techniques.

As a still further feature of this invention, I have found that while the metallic film deposited on the sensitized glass surface withstands washing, scrubbing, and soldering thereto, it is possible to remove the film from the glass by pulling the film in a direction perpendicular to the surface thereof. While removing the film in this manner also removes a substantial proportion of the electro-conductive sensitizing film it does not affect the colloidal silver image. Thus, a glass surface sensitized with the colloidal silver image can be utilized as a master for forming duplicate metal patterns, for example, fine-mesh metal screens.

While any glass base can be sensitized by the application of an electro-conducting metal oxide film thereto, only glasses containing a substantial amount of alkali metal oxide, as explained in the aforementioned patent, can be sensitized by forming a colloidal silver image on the surface thereof. More particularly, I have found that glasses of the soda-lime-silicate type such as those described in United States Patent No. 1,369,988 are particularly suitable in that a very uniform metallic film is formed on the colloidal silver image produced thereon.

Example 1

A positive image of a line drawing is reproduced by conventional procedure in a stripping film known as "Kodalith" and applied to a sheet of window glass having an approximate softening point of 720° C. and a strain point of 490° C. A paste composed of 25% of ferric sulphate and 75% of ocher mixed with water is applied as a coating over the film and, when dry, the coated sheet is heated with sufficient slowness so that about 1 hour is required for its temperature to reach 450° C. The plate is maintained at such elevated temperature for about 30 minutes and thereafter cooled. After the removal of the residue from the glass sheet it is again heated at 450° C. for 15 minutes in an atmosphere of hydrogen. The resulting image in the glass is positive and the lines are so densely colored as to appear substantially black.

The portions of the glass which are thereby silver stained are then copper-coated by the copper tartrate formaldehyde process. In such process, the copper tratrate solutions are prepared and stored as two separate solutions. Solution 1 consists of 34.6 grams of $CuSO_4 \cdot 5H_2O$ dissolved in 500 cc. of distilled water. Solution 2 consists of 173 grams of Rochelle salt (sodium potassium tartarte) and 65 grams of sodium hydroxide dissolved in 500 cc. of distilled water. Such solutions are utilized in the coating process by mixing equal volumes of the solutions in a non-metallic container and diluting the mixture with distilled water to about ⅕ of its original concentration. Thereafter formaldehyde in an amount equivalent to about 1–2% of the total volume is added to the diluted mixture. The sensitized glass plate is then placed in the bath which is warmed to about 60° C. for 5–10 minutes. The end-point of the plating process is evidenced by the fact that the bath changes from blue to muddy red and evolution of hydrogen gas stops. The finished coated glass plate is then rinsed in water and dried. An adherent film of copper is thereby deposited on the glass surface only on such portion as was sensitized by the silver staining.

*Example II*

A plate of a borosilicate glass having a softening point of 820° C. and a strain point of 515° C. is coated with a clay masking compound of the conventional type utilized when forming iridized metal oxide films on the surface of glasses. A line drawing is formed in the masking compound by removing the clay in the desired selection portions to expose the glass surface thereunder. The plate is thereafter heated to a temperature of about 600–650° C. and exposed to an atomized solution of tin and antimony chlorides to produce on the exposed surface thereof an electro-conductive film containing about 95% tin oxide and 5% antimony oxide. The heating and spraying operations are repeated until a suitable film thickness, for example, one having a third-order red thickness, is obtained. The glass is then cooled and washed in water to remove the masking compound therefrom.

A silver coating is then deposited upon the sensitized surface of the glass plate in the manner described in the publication "The Making of Mirrors by the Deposition of Metal on Glass," Bureau of Standards No. 389, and in particular using the Brashear process described therein. An adherent silver film is thereby produced on the surface of the glass corresponding to the line drawing originally delineated in the clay masking compound.

*Example III*

The method of Example I is utilized to produce a copper film in the form of a mesh. The coated plate is thereafter placed in a conventional copper electro-plating solution in such a manner that the copper film is made the cathode of the plating cell. The plating is carried out for a sufficient length of time so as to deposit on the copper mesh an additional thickness of copper of about 3 mils. The copper mesh is thereafter removed from the glass plate by applying a force perpendicularly to the plane of the glass surface upon which it is deposited, such as by forcing a razor blade between the copper mesh and the glass surface. The copper mesh thus removed can be utilized in a variety of applications, such as a grid in a vacuum tube or as a sieve. Furthermore, the sensitized glass plate can thereafter be utilized to form additional copper films thereon which in turn can subsequently have thicker copper coatings formed by the electro-plating process.

What is claimed is:

1. A method of producing a metal film of a predetermined configuration on the surface of a glass article which comprises applying an electro-conductive metal oxide sensitizing film by hydrolysis at about 500°–650° C. to an area of the glass surface corresponding to the desired configuration and immersing at least the sensitized area of the glass surface in a metallic mirror-depositing solution, and thereafter washing the coated glass surface to remove the metallic mirror from the non-sensitized area.

2. A method of producing a metal film according to claim 1 in which a copper-mirror solution is utilized.

3. A method of producing a metal film according to claim 1 in which a silver-mirror solution is utilized.

References Cited by the Examiner

UNITED STATES PATENTS

| | | | |
|---|---|---|---|
| 2,732,298 | 1/1956 | Stookey | 117—54 X |
| 2,872,359 | 2/1959 | Saubestre | 117—213 |
| 3,011,920 | 12/1961 | Shipley | 117—213 |
| 3,135,046 | 6/1964 | Stookey | 117—212 |

RICHARD D. NEVIUS, *Primary Examiner.*

W. L. JARVIS, *Assistant Examiner.*